United States Patent
Choi et al.

(10) Patent No.: US 11,651,140 B2
(45) Date of Patent: May 16, 2023

(54) FONT GENERATING DEVICE AND METHOD FOR CHANGING PARTIAL CHARACTER STYLE

(71) Applicant: Foundation of Soongsil University-Industry Cooperation, Seoul (KR)

(72) Inventors: Jaeyoung Choi, Seoul (KR); Geunho Jeong, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 148 days.

(21) Appl. No.: 17/105,215

(22) Filed: Nov. 25, 2020

(65) Prior Publication Data

US 2021/0174002 A1 Jun. 10, 2021

(30) Foreign Application Priority Data

Dec. 9, 2019 (KR) .......................... 10-2019-0162683

(51) Int. Cl.
*G06F 17/00* (2019.01)
*G06F 40/109* (2020.01)
(Continued)

(52) U.S. Cl.
CPC .......... *G06F 40/109* (2020.01); *G06F 40/137* (2020.01); *G06F 40/205* (2020.01)

(58) Field of Classification Search
CPC .... G06F 40/109; G06F 40/137; G06F 40/205; G06V 30/244
(Continued)

(56) References Cited

U.S. PATENT DOCUMENTS 3,852,720 A * 12/1974 Park .................... B41B 27/00
 400/104
5,526,477 A * 6/1996 McConnell ........... G06T 11/203
 345/467
(Continued)

FOREIGN PATENT DOCUMENTS

JP 3-103896 A 4/1991
JP 2000-242260 A 9/2000
(Continued)

OTHER PUBLICATIONS

Gwon, G.J. et al.,"Korean Outline Font Editing System Based on UFO Using METAFONT," (Oct. 5, 2016), In Conf. on the Human and Lang. Tech. Ann. (Korea Institute of Info. Tech., Language and Science Conf. (Hangul and Korean Information Processing)), pp. 44-48. (English Translation provided by USPTO STIC).*
(Continued)

*Primary Examiner* — Cesar B Paula
*Assistant Examiner* — James H. Blackwell
(74) *Attorney, Agent, or Firm* — Stein IP, LLC

(57) ABSTRACT

Provided is a font generating method including generating an intermediate code by adding attributes for METAFONT to code of an outline font, generating a font in the METAFONT by parsing the intermediate code, hierarchizing the font into a whole set representing a whole of a character and a partial set representing a part of the character, and changing a style of the font according to a relational equation representing a relationship between the whole set and the partial set.

9 Claims, 20 Drawing Sheets

(51) Int. Cl.
*G06F 40/205* (2020.01)
*G06F 40/137* (2020.01)

(58) Field of Classification Search
USPC .................................. 715/256; 345/947, 948
See application file for complete search history.

(56) References Cited

U.S. PATENT DOCUMENTS

| | | | | |
|---|---|---|---|---|
| 7,721,222 | B1* | 5/2010 | Shaik ................. | G06F 3/04886 715/810 |
| 10,061,752 | B2* | 8/2018 | Choi ..................... | G06T 11/203 |
| 11,036,917 | B2* | 6/2021 | Choi ........................ | G09G 5/24 |
| 2008/0158023 | A1* | 7/2008 | Chung ................... | G06F 3/018 341/28 |
| 2013/0033444 | A1* | 2/2013 | Park ................... | G06F 3/04883 345/173 |
| 2015/0317817 | A1* | 11/2015 | Ryu ...................... | G06F 40/109 345/471 |
| 2017/0053424 | A1* | 2/2017 | Wang ................... | G06F 40/109 |
| 2018/0046600 | A1* | 2/2018 | Choi ..................... | G06T 11/203 |
| 2020/0327276 | A1* | 10/2020 | Choi ....................... | G06F 40/12 |

FOREIGN PATENT DOCUMENTS

| | | | | |
|---|---|---|---|---|
| KR | 2002-0073929 | A | | 9/2002 |
| KR | 10-2004-0085659 | A | | 10/2004 |
| KR | 10-0703331 | B1 | | 4/2007 |
| KR | 10-2016-0133271 | A | | 11/2016 |
| KR | 10-2018-0088087 | A | | 8/2018 |
| WO | 98/36630 | A2 | | 8/1998 |
| WO | WO-2015078145 | A1 | * | 6/2015 ............ G06F 17/211 |
| WO | WO-2018139700 | A1 | * | 8/2018 .............. G06F 17/11 |

OTHER PUBLICATIONS

Southhall, R., "Designing New Typefaces with Metafont," (Apr. 18, 2007), Software Patent Institute, 39 pages.*
Knuth, D.E.,"Metafont, A System for Alphabet Design," (Oct. 30, 1979), 59 pages total.*
Li, J.,"Generation of Some Chinese Characters with Metafont. A Graduation Thesis," (Apr. 17, 2007), Software Patent Institute, 39 pages total.*
Huang, M.,"Bold, Italic, Emphatic—Possibilities for Interactive Type," (May 6, 2011), IEEE, pp. 8-13.*
Hu, C. et al.,"Parameterizable Fonts Based on Shape Components," (May 6, 2001), IEEE, pp. 70-85.*
Wong, P.Y.C. et al.,"Designing Chinese Typeface Using Components," (1995), IEEE, pp. 416-421.*
Miyazaki, T. et al.,"Automatic Generation of Typographic Font From a Small Font Subset," (Jan. 20, 2017), arXiv, 11 pages.*
Hobby, J. et al.,"A Chinese Meta-Font," (Apr. 19, 2007), Software Patent Institute, pp. 1-22.*
Lim, S-B et al.,"Oriental Character Font Design by a Structured Composition of Stroke Elements," (1995) Computer-Aided Design, vol. 27,No. 3, pp. 193-207.*
Noh, S. et al.,"UFO2xMF System Generating METAFONT for Korean Characters and Roman," 2018.2, KIISE Transactions on Computing PRactices, vol. 24, No. 2, pp. 88-92 (English Translation provided by USPTO STIC).*
Son, M. et al.,"Korean/Chinese Web-Based Font Editor Based on METAFONT for User Interaction," 2017, Springer, 8 pages.*
Gwon, G-J et al.,"Outline Font System for Korean Characters Based on UFO and Using METAFONT," (2016) Proc. of the 28th Annual Conf. on Human and Cognitive Language Technology, pp. 44-48 (English Translation provided by USPTO STIC).*
Choi, J. et al.,"Apparatus and Method for Generating Font by Means of METAFONT by Using Outline Font," published Feb. 8, 2018, 16 pages (English Translation of WO/2018/139700, by WIPO Translate).*
Gwon, G. et al.,"Structured Korean Font Generator Using METAFONT," 2016.9, KIISE Transactions on Computing Practices, vol. 22, No. 9, pp. 449-454 (English Translation provided by USPTO STIC).*
Son, M. et al.,"GUI-Based Chinese Font Editing System Using Font Parameterization Technique," 2017, Typography and Diversity (http://www.typoday.in), 10 pages.*
Shamir, A. et al.,"Feature-Based Design of Fonts Using Constraints," Dec. 1998, 17 pages.*
Li, Minghao et al.,"Method and Apparatus for Enlarging Display Font," ENGLISH Translation, WO2015078145, published Jun. 4, 2015, 44 pages.*
Gwon, Gyeong Jae, et al. "Korean Outline Font Editing System based on UFO Using METAFONT", Korean Language Information Science Society (Korean Information Society), 2016, p. 44-48, Seoul, Korea.
Ariel Shamir, et al. "Feature-Based Design of Fonts Using Constraints", Institute of Computer Science, , The Hebrew University, Jerusalem, Israel. Dec. 1998.

* cited by examiner

FIG. 4a

```xml
<?xml version="1.0" encoding="UTF-8"?>
<glyph name="a" format="1">
    <advance width="1024"/>
    <outline>
        <contour>
            <point penPair="z1l" innerType="fill" serif="1" x="576" y="963" type="line"/>
            <point penPair="z2l" serif="2" x="576" y="413" type="line"/>
            <point penPair="z2l" x="644" y="413" type="line"/>
            <point penPair="z3l" dependx="x2r" x="644" y="753" type="line"/>
            <point penPair="z4l" x="753" y="753" type="line"/>
            <point penPair="z4l" x="753" y="817" type="line"/>
            <point penPair="z3l" dependx="x1r" x="644" y="817" type="line"/>
            <point penPair="z1l" x="644" y="963" type="line"/>
        </contour>
    </outline>
</glyph>
```

FIG. 5a

```
1   <glyph format="2" name="AC1l_C">
2       <advance width="550" />
3       <outline>
4           <contour>
5               <point char="0" formType="2" innerType="fill" penPair="z1r" round="1" sound="first" type="line" x="75" y="435" />
6               <point penPair="z1l" round="1" type="line" x="75" y="367" />
7               <point penPair="z3l" type="line" x="211" y="367" />
8               <point penPair="z2l" round="1" type="line" x="211" y="203" />
9               <point penPair="z2r" round="1" type="line" x="285" y="203" />
10              <point penPair="z3r" round="1" type="line" x="285" y="435" />
11          </contour>
12      </outline>
13  </glyph>
```

FIG. 6a

```
1   <glyph format="2" name="AC1l_V">
2      <advance width="550" />
3      <outline>
4         <contour>
5            <point char="0" formType="2" innerType="fill" penPair="z4l" sound="middle" type
             ="line" x="409" y="284" />
6            <point penPair="z5l" round="1" type="line" x="521" y="284" />
7            <point penPair="z5r" round="1" type="line" x="521" y="352" />
8            <point penPair="z4r" type="line" x="409" y="352" />
9         </contour>
10        <contour>
11           <point char="0" formType="2" innerType="fill" penPair="z6r" round="1" sound="
             middle" type="line" x="446" y="445" />
12           <point penPair="z6l" round="1" serif="1" type="line" x="372" y="445" />
13           <point penPair="z7l" round="1" type="line" x="372" y="193" />
14           <point penPair="z7r" round="1" type="line" x="446" y="193" />
15        </contour>
16     </outline>
17  </glyph>
```

FIG. 7a

```
1   <glyph format="2" name="AC1l_F">
2      <advance width="550" />
3      <outline>
4         <contour>
5            <point char="17" dependY="z13l" formType="2" innerType="fill" penPair="z8r"
               sound="final" type="line" x="290" y="-111" />
6            <point penPair="z9r" round="1" type="line" x="290" y="154" />
7            <point penPair="z9l" round="1" type="line" x="218" y="154" />
8            <point dependY="z13l" penPair="z8l" round="1" type="line" x="218" y="-111" />
9         </contour>
10        <contour>
11           <point char="17" formType="2" innerType="fill" penPair="z10r" sound="final"
              type="line" x="408" y="81" />
12           <point penPair="z11r" type="line" x="254" y="81" />
13           <point penPair="z11l" type="line" x="254" y="16" />
14           <point penPair="z10l" type="line" x="408" y="16" />
15        </contour>
16        <contour>
17           <point char="17" formType="2" innerType="fill" penPair="z12r" sound="final"
              type="line" x="408" y="-47" />
18           <point penPair="z13r" type="line" x="254" y="-47" />
19           <point penPair="z13l" type="line" x="254" y="-111" />
20           <point penPair="z12l" type="line" x="408" y="-111" />
21        </contour>
22        <contour>
23           <point char="17" dependY="z12l" formType="2" innerType="fill" penPair="z14r"
              round="1" sound="final" type="line" x="444" y="-111" />
24           <point penPair="z15r" round="1" type="line" x="444" y="154" />
25           <point penPair="z15l" round="1" type="line" x="372" y="154" />
26           <point dependY="z12l" penPair="z14l" type="line" x="372" y="-111" />
27        </contour>
28     </outline>
29  </glyph>
```

FIG. 8

```
def ACoo_C(expr width, Height, woveSizeOfH, moveSizeOfV, penWidthRate, penHeightRate, curveRate, serifRate, unfillRate, isUnfill) *
penWidth_1 := (((penWidthRate - 1) * 0.0) / 2) * Width;  penHeight_1 := (((penHeightRate - 1) * -0.123) / 2) * Height;
penWidth_2 := (((penWidthRate - 1) * -0.134) / 2) * Width;  penHeight_2 := (((penHeightRate - 1) * 0.0) / 2) * Height;
penWidth_3 := (((penWidthRate - 1) * -0.134) / 2) * Width;  penHeight_3 := (((penHeightRate - 1) * -0.123) / 2) * Height;
x1r := (0.136 + moveSizeOfH) * Width - penWidth_1;  y1r := (0.790 + moveSizeOfV) *Height - penHeight_1;
x1l := (0.136 + moveSizeOfH) * Width + penWidth_1;  y1l := (0.667 + moveSizeOfV) *Height + penHeight_1;
x3l := (0.383 + moveSizeOfH) * Width + penWidth_3;  y3l := (0.667 + moveSizeOfV) *Height + penHeight_3;
x2l := (0.383 + moveSizeOfH) * Width + penWidth_2;  y2l := (0.369 + moveSizeOfV) *Height + penHeight_2;
x2r := (0.518 + moveSizeOfH) * Width - penWidth_2;  y2r := (0.369 + moveSizeOfV) *Height - penHeight_2;
x3r := (0.518 + moveSizeOfH) * Width - penWidth_3;  y3r := (0.790 + moveSizeOfV) *Height - penHeight_3;
if curveRate > 0.0:
    x1_R0r := x1r+ abs(y1l - y1r) / 2 * curveRate; y1_R0r := y1r+ abs(x1l - x1r) / 2 * curveRate;
    x1_R1r := x1r+ abs(y1l - y1r) / 2 * curveRate * 0.45;   y1_R1r := y1r+ abs(x1l - x1r) / 2 * curveRate * 0.45;
    x1_R2r := x1r+ abs(x1l - x1r) / 2 * curveRate * 0.45;   y1_R2r := y1r- abs(y1l - y1r) / 2 * curveRate * 0.45;
    x1_R3r := x1r+ abs(x1l - x1r) / 2 * curveRate; y1_R3r := y1r- abs(y1l - y1r) / 2 * curveRate;
    x1_R0l := x1l+ abs(x1l - x1r) / 2 * curveRate; y1_R0l := y1l+ abs(y1l - y1r) / 2 * curveRate;
    x1_R1l := x1l+ abs(x1l - x1r) / 2 * curveRate * 0.45;   y1_R1l := y1l+ abs(y1l - y1r) / 2 * curveRate * 0.45;
    x1_R2l := x1l+ abs(y1l - y1r) / 2 * curveRate * 0.45;   y1_R2l := y1l+ abs(x1l - x1r) / 2 * curveRate * 0.45;
    x1_R3l := x1l+ abs(y1l - y1r) / 2 * curveRate; y1_R3l := y1l+ abs(x1l - x1r) / 2 * curveRate;
    x2_R0l := x2l+ abs(y2l - y2r) / 2 * curveRate; y2_R0l := y2l+ abs(x2l - x2r) / 2 * curveRate;
    x2_R1l := x2l+ abs(y2l - y2r) / 2 * curveRate * 0.45;   y2_R1l := y2l+ abs(x2l - x2r) / 2 * curveRate * 0.45;
    x2_R2l := x2l+ abs(x2l - x2r) / 2 * curveRate * 0.45;   y2_R2l := y2l+ abs(y2l - y2r) / 2 * curveRate * 0.45;
    x2_R3l := x2l+ abs(x2l - x2r) / 2 * curveRate; y2_R3l := y2l+ abs(y2l - y2r) / 2 * curveRate;
    x2_R0r := x2r- abs(x2l - x2r) / 2 * curveRate; y2_R0r := y2r+ abs(y2l - y2r) / 2 * curveRate;
    x2_R1r := x2r- abs(x2l - x2r) / 2 * curveRate * 0.45;   y2_R1r := y2r+ abs(y2l - y2r) / 2 * curveRate * 0.45;
    x2_R2r := x2r+ abs(y2l - y2r) / 2 * curveRate * 0.45;   y2_R2r := y2r+ abs(x2l - x2r) / 2 * curveRate * 0.45;
    x2_R3r := x2r+ abs(y2l - y2r) / 2 * curveRate; y2_R3r := y2r+ abs(x2l - x2r) / 2 * curveRate;
    x3_R0r := x3r;  y3_R0r := y3r- max(abs(x3l - x3r), abs(y3l - y3r)) / 2 * curveRate;
    x3_R1r := x3r;  y3_R1r := y3r- max(abs(x3l - x3r), abs(y3l - y3r)) / 2 * curveRate * 0.45;
    x3_R2r := x3r- max(abs(x3l - x3r), abs(y3l - y3r)) / 2 * curveRate * 0.45; y3_R2r := y3r ;
    x3_R3r := x3r- max(abs(x3l - x3r), abs(y3l - y3r)) / 2 * curveRate; y3_R3r := y3r ;
fi
if isUnfill:
    index := 2;
else:
    index := 0;
fi
for x = 0 upto index:
    if curveRate > 0.0:
        if isUnfill:
            unfill
        else:
            fill
        fi
        z1_R0r .. controls (z1_R1r) and (z1_R2r) ..
            z1_R3r --
        z1_R0l .. controls (z1_R1l) and (z1_R2l) ..
            z1_R3l --
        z3l --
        z2_R0l .. controls (z2_R1l) and (z2_R2l) ..
            z2_R3l --
        z2_R0r .. controls (z2_R1r) and (z2_R2r) ..
            z2_R3r --
        z3_R0r .. controls (z3_R1r) and (z3_R2r) ..
            z3_R3r --
        cycle;
            else:
        if isUnfill:
            unfill
        else:
            fill
        fi
        z1r --
        z1l --
        z3l --
        z2l --
        z2r --
        z3r --
        cycle;
    fi
endfor
penlabels(range 1 thru 400);
enddef;
```

FONT GENERATING DEVICE AND METHOD FOR CHANGING PARTIAL CHARACTER STYLE

CROSS-REFERENCE TO RELATED APPLICATIONS

This application claims priority under 35 U.S.C. § 119 to Korean Patent Application No. 10-2019-0162683, filed on Dec. 9, 2019, in the Korean Intellectual Property Office, the disclosure of which is incorporated herein by reference in its entirety.

TECHNICAL FIELD

Embodiments of the present disclosure relate to a font generating device and method for changing the partial character style, and more particularly, to a font generating device and method, in which the use of outline font editing achieves real-time generation of a new font, it is possible to significantly reduce the time and cost when designing a font based on outline editing to generate a new font, and various fonts are generated in a convenient manner by changing the font attributes.

BACKGROUND

Text is an effective method of recording and transmitting information. With the widespread use of smart devices, users represent text on digital devices using digital fonts rather than analog fonts such as handwriting. In this environment, digital fonts of various styles are being created.

The commonly used digital fonts include a bitmap font type and an outline font type. The bitmap font defines a bitmap image per character, and thus needs a separate file for each size to support the size of the character. The outline font is a font type in which functions are used to draw the shape of the character, and works by drawing the outline of the font using straight lines and curves and filling the interior area. The outline font can freely scale the size of the character by calculating outline information, so it is possible to use fonts irrespective of the size and achieve high quality output. However, in the case of the bitmap font and the outline font, manual modifications are necessary to change the style of the existing font such as thickness and shape of stroke.

In more detail, the bitmap font is a fixed image font, and thus needs to create a new font according to the size of the font. Accordingly, it takes a long time to create a font according to the required character size, and font data is stored with very large capacity.

The outline font designed to overcome this disadvantage can freely scale the size of the character and thus has characters of all sizes, and since the outline font needs single font data, it is stored with lower capacity than the bitmap font that is stored with large capacity. However, the outline font undergoes a complicated mathematical process of rasterizing, causing overload on the system, and as the number of points and lines increases, the load increases. Additionally, to represent a character, the outline font has only reference point and control point information of the character, and does not have information about strokes. Accordingly, font designers need to modify the reference point and the control point to change the style of the existing font such as thickness and shape of stroke.

SUMMARY

To solve the above-described problem of the conventional art, the present disclosure proposes a font generating device and method, in which the use of outline font editing achieves real-time generation of a new font, it is possible to significantly reduce the time and cost when designing a font based on outline editing to generate a new font, and various fonts are generated in a convenient manner by changing the font attributes.

Other objects of the present disclosure will be derived by those skilled in the art through the following embodiments.

According to an aspect of the present disclosure, a font generating method for changing partial character style, performed by a device including a processor, includes: (a) generating an intermediate code by adding attributes for METAFONT to code of an outline font described in eXtensible Markup Language (XML), (b) generating a font in the METAFONT using information of points acquired by parsing the intermediate code, (c) hierarchizing the font into a whole set representing a whole of a character represented by the font and a partial set representing a part of the character represented by the font, and (d) generating a relational equation representing a relationship between the whole set and the partial set, and changing a style of the font according to the relational equation.

Additionally, the whole set may be generated to include syllables into which the character represented by the font in the METAFONT is classified.

Additionally, the partial set may be generated to include a grapheme represented as at least one of the initial letter, the medial letter or the final letter according to the syllables of the character represented by the font.

Additionally, the attributes for the METAFONT may include at least one of a first additional attribute for adjusting roundness at an end of a stroke of the character or a curved part of the stroke, a second additional attribute for determining a grapheme and a radical of an outline, a third additional attribute for setting a combination type of the character, a fourth additional attribute for setting a position of the outline, a fifth additional attribute for setting a partial stroke represented by the outline, a sixth additional attribute for setting a position in a double consonant or a seventh additional attribute for setting a shape of the stroke of the character.

Additionally, the font in the METAFONT may include a primary reference line according to at least one of the attributes for the METAFONT.

Additionally, the generating the relational equation may include changing the style of the font according to the relational equation wherein a position the primary reference line is fixed.

Another aspect of the present disclosure may be a non-transitory computer-readable recording medium having recorded thereon a program for performing the method.

According to still another aspect of the present disclosure, a font generating device includes at least one processor configured to generate an intermediate code by adding attributes for METAFONT to code of an outline font described in XML, and to generate a font in the METAFONT using information of points acquired by parsing the intermediate code, hierarchize the font into a whole set representing a whole character represented by the font and a partial set representing a part of the character represented by the font, generate a relational equation representing a relationship between the whole set and the partial set, and change a style of the font according to the relational equation.

Additionally, the whole set may be generated to include syllables into which the character represented by the font in the METAFONT is classified.

Additionally, the partial set may be generated to include a grapheme represented as at least one of the initial letter, the medial letter or the final letter according to the syllables of the character represented by the font.

Additionally, the attributes for the METAFONT may include at least one of a first additional attribute for adjusting roundness at an end of a stroke of the character or a curved part of the stroke, a second additional attribute for determining a grapheme and a radical of an outline, a third additional attribute for setting a combination type of the character, a fourth additional attribute for setting a position of the outline, a fifth additional attribute for setting a partial stroke represented by the outline, a sixth additional attribute for setting a position in a double consonant or a seventh additional attribute for setting a shape of the stroke of the character.

Additionally, the font in the METAFONT may include a primary reference line according to at least one of the attributes for the METAFONT.

Additionally, the at least one processor may be further configured to change the style of the font according to the relational equation wherein a position of the primary reference line is fixed.

According to an aspect of the present disclosure as described above, there is provided a device and method for generating a font using outline font editing, in which the use of outline font editing achieves real-time generation of a new font, it is possible to significantly reduce the time and cost when designing a font based on outline editing to generate a new font, and various fonts are generated in a convenient manner by changing the font attributes.

BRIEF DESCRIPTION OF THE DRAWINGS

FIGS. 4A to 4C are diagrams showing an example of intermediate code according to an embodiment of the present disclosure.

FIGS. 5A to 7B are diagrams showing an example of intermediate code (MetaUFO) according to an embodiment of the present disclosure.

FIGS. 8 to 9B are diagrams showing an example of METAFONT code according to an embodiment of the present disclosure.

DETAILED DESCRIPTION OF EMBODIMENTS

Unless the context clearly indicates otherwise, the singular forms include the plural forms as well. The term "comprise" or "include" when used in this specification should not be interpreted as including all of many elements or steps described herein, and it should be interpreted that among them, some elements or steps may not be included or additional element or steps may be further included. Additionally, the terms "unit" and "module" as used herein refer to a processing unit of at least one function or operation, and this may be implemented in hardware or software or a combination thereof. In particular, the term "unit" may be defined as having its broadest definition to an ordinary skill in the art to refer to a software including instructions executable in a non-transitory computer readable medium that would perform the associated function when executed, a circuit designed to perform the associated function, a hardware designed to perform the associated function, r a combination of a software, a circuit, or a hardware designed to perform the associated function.

Hereinafter, various embodiments of the present disclosure will be described with reference to the accompanying drawings.

First, the concept of METAFONT on which the present disclosure is based will be described herein.

METAFONT is a system that provides fonts for use in TeX, and includes 'character drawing functions' that define how to draw each character and 'style parameters' for styling the characters. That is, the character drawing method is predefined, while the parameters (style values) for determining the style are separate, and thus METAFONT may modify fonts in a desired style by changing the style parameters.

Figure 1:
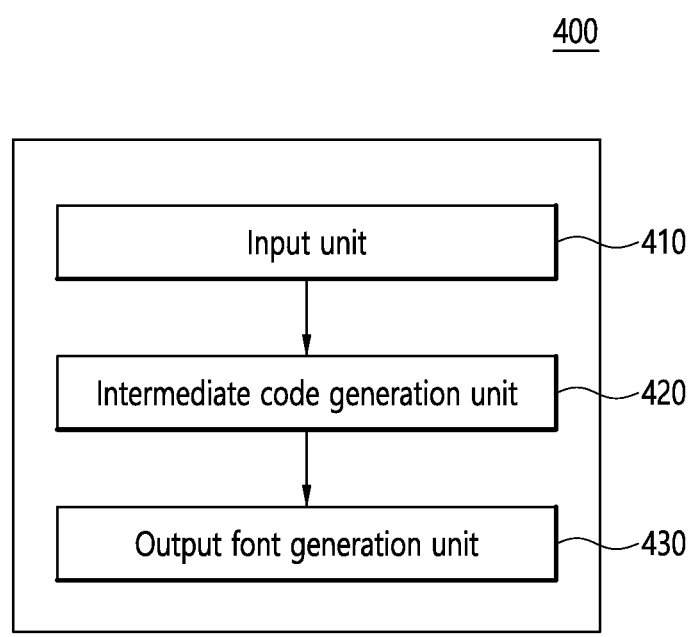
FIG. 1 is a diagram showing a schematic configuration of a font generating device according to an embodiment of the present disclosure.

FIG. 1 is a diagram showing a schematic configuration of a font generating device according to an embodiment of the present disclosure.

Referring to FIG. 1, the font generating device 400 according to an embodiment of the present disclosure is a device for generating fonts in METAFONT, and includes an input unit 410, an intermediate code generation unit 420 and an output font generation unit 430.

Figure 2:
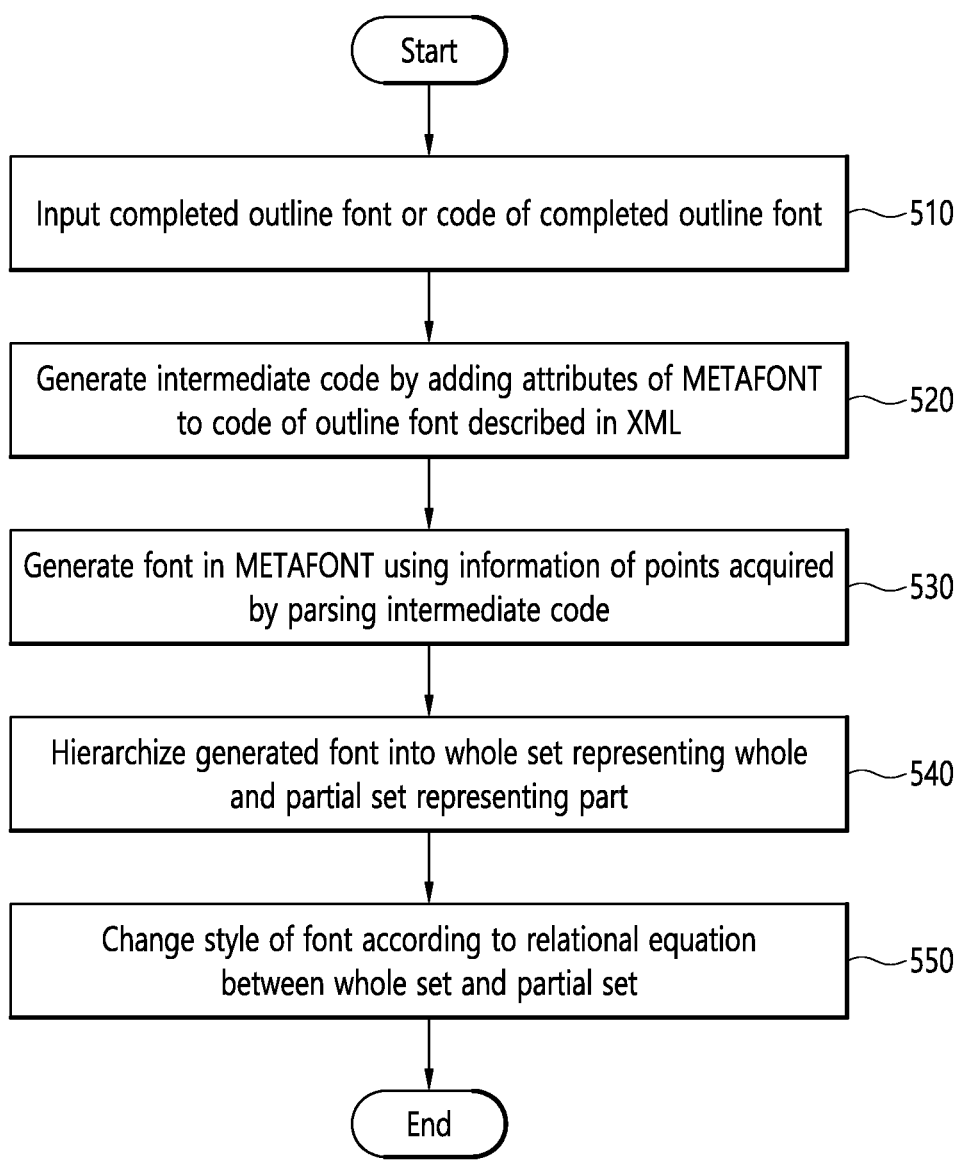
FIG. 2 is a flowchart of a font generating method according to an embodiment of the present disclosure.

Additionally, FIG. 2 is a flowchart of a font generating method according to an embodiment of the present disclosure. In this instance, the method may be performed by the font generating device 400 which is a device including a processor.

Figure 3:
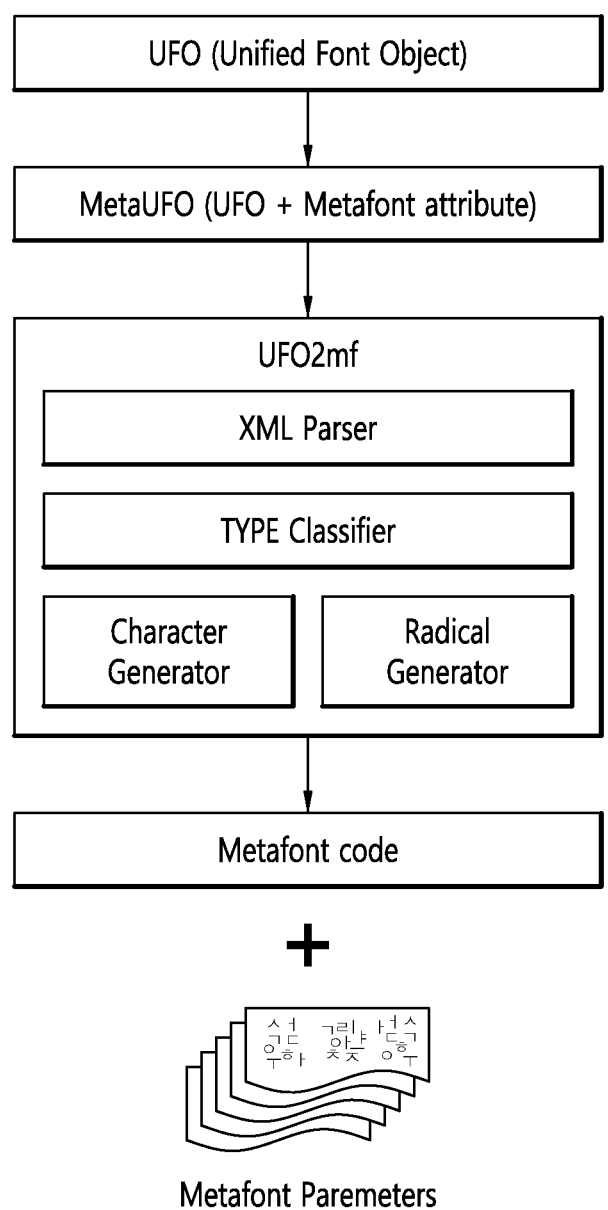
FIG. 3 is a representative drawing illustrating a detailed structure of a system for carrying out the present disclosure.

Additionally, FIG. 3 is a representative drawing illustrating a detailed structure of a system for carrying out the method of the present disclosure.

Hereinafter, the function of each element and the process performed in each step will be described with reference to FIGS. 1 to 3.

First, in the step 510, the input unit 410 receives an input of a completed outline font or code of the completed outline font. In this instance, the completed outline font is a font described in eXtensible Markup Language (XML), and may be a font generated by a font designer.

Subsequently, in the step 520, the intermediate code generation unit 420 generates an intermediate code by adding the METAFONT attributes to the code of the outline font described in XML.

Subsequently, in the step 530, the output font generation unit 430 generates a font in METAFONT using information of points acquired by parsing the intermediate code.

That is, according to the present disclosure, the intermediate code generation unit 420 may generate an intermediate code by adding attributes necessary for METAFONT and attributes for supporting special functions used in METAFONT to the outline font (described in XML) with which font designers are familiar, the output font generation unit 430 may receive the intermediate code as an input file and calculate data acquired by parsing to generate METAFONT code, and a font user may generate fonts in various styles by changing parameter values for changing the style in the generated METAFONT code.

Subsequently, in the step 540, the output font generation unit 430 may hierarchize the font generated from the METAFONT code into a whole set representing the whole character represented by the font and a partial set representing a part of the character represented by the font. In the METAFONT code, it may be understood that the code applied to the whole character is set to the whole set, and the code applied to any one of the initial letter, the medial letter and the final letter of the character is each set to the partial set.

Subsequently, in the step 550, a relational equation represented by a relationship between the whole set and the partial set may be generated, and the style of the font may be changed according to the relational equation. Accordingly, the font in METAFONT may individually change the style of the components of the character such as the initial letter, the medial letter, the final letter, the radical and the left and right parts.

The present disclosure will be described in more detail as below.

According to an embodiment of the present disclosure, an outline font may be a font according to Unified Font Object (UFO).

UFO has a directory structure as opposed to the general outline font implemented as a single file. Additionally, as opposed to other outline fonts in binary format, UFO describes font data in XML and defines in a human-readable and machine-readable format.

The greatest feature of UFO is that the user can define the undefined tag or attribute of XML. Using this feature, in the steps 520 and 530, data necessary for the system may be added to the UFO code, followed by parsing.

Hereinafter, for convenience of description, a description is provided under the assumption that the outline font is UFO. However, the present disclosure is not limited thereto.

Additionally, according to an embodiment of the present disclosure, the attributes for METAFONT added in the step 520 may be represented as shown in the following Table 1, and may be included in the UFO code.

TABLE 1

| Attribute name | Description | Essential or optional |
| --- | --- | --- |
| penPair (First attribute) | Set two points as a pair | Essential (All points) |
| innerType (Second attribute) | Set whether to fill or unfill inside of outline | Essential (Start point) |
| dependX(Y) (Third attribute) | A change in X(Y) coordinates depends on set point | Optional |
| Serif (Fourth attribute) | Set serif | Optional |

In detail, as opposed to outline fonts, METAFONT draws the frame of a character like handwriting, and draws the character while moving a pen along the flow of the frame. Accordingly, METAFONT may easily change the thickness of the character that is difficult to change in outline fonts using the function for adjusting the thickness of the pen that fills the frame. In this instance, to use the function for adjusting the thickness of the pen, it is necessary to define the two ends of the pen. That is, it is possible to pair the points present in UFO to fit the two ends of the pen, and to this end, the first attribute (penPair) is used. The first attribute (penPair) is an attribute for setting two of the points for forming the outline as a pair, and it is an essential attribute. Here, the thickness may be adjusted by acquiring information that the two points form a pair by adding the attribute 'penPair' to the tag 'point' present in UFO.

Additionally, METAFONT has different functions used to fill or unfill the inside formed by drawing the outline, and to this end, the second attribute (innerType) is used. That is, the second attribute (innerType) is specified at the start point of the outline, and is an attribute for setting whether to fill the inside of the outline, and it is an essential attribute.

Additionally, the third attribute (dependX(Y)) is an attribute for changing the position coordinates of the point B depending on the position coordinates of the point A of which the position coordinates have been set, and the fourth attribute (serif) is an attribute for setting the serif of the point, and it is an optional attribute.

Besides, the present disclosure provides a custom parameter attribute for allowing the user to change the positions of specific points all at once, and using this, the user may parametrize a desired part.

Hereinafter, the attributes for METAFONT are described in detail with reference to FIG. 4.

Figure 4B:
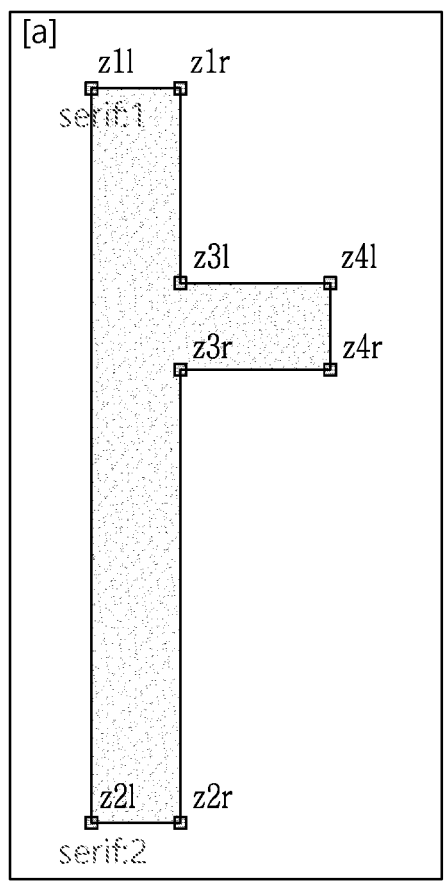
Figure 4C:
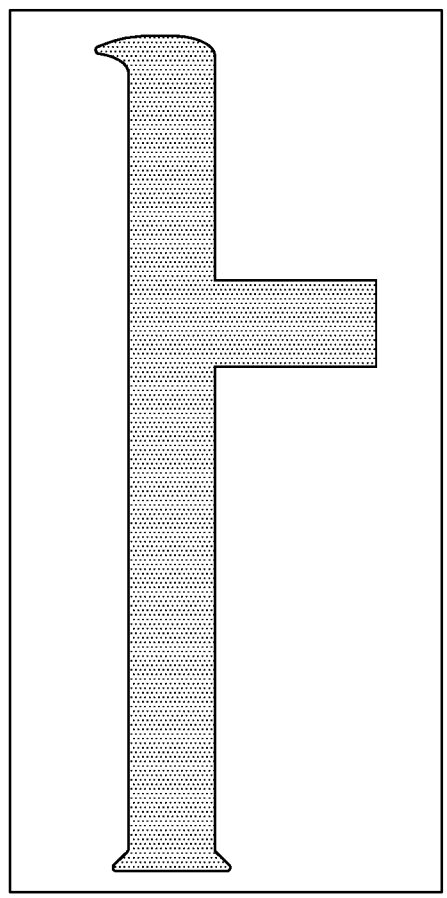

FIG. 4 is a diagram showing an example of intermediate code (MetaUFO) according to the present disclosure. That is, FIG. 4(A) shows the intermediate code in which the attributes for METAFONT are added to UFO to represent the grapheme 'ㅏ', FIG. 4(B) illustrates the intermediate code shown in FIG. 4(A). Additionally, FIG. 4(C) shows the grapheme 'ㅏ' of METAFONT (including the serif) generated through FIGS. 4(A) and (B).

Referring to FIG. 4, 'penPair' (first attribute) is added to the tag 'point' in the UFO code. Here, it can be seen that two points are paired up through 'zNl' and 'zNr'. In this instance, 'l' is a symbol representing the left point, 'r' is a symbol representing the right point, and the two points are connected to form a pair using the number value of N in 'zN'. That is, 'z1l' and 'z1r' are paired into one image, 'z2l' and 'z2r' are paired into one image, 'z3l' and 'z3r' are paired into one image, and 'z4l' and 'z4r' are paired into one image.

Additionally, 'innerType' (second attribute) is added to the tag 'point' in the UFO code. In this instance, since it fills the inside of the outline of the grapheme 'ㅏ', 'innerType' in the first tag 'point' is set to 'fill'.

Additionally, 'dependX' (third attribute) is added to the tag 'point' in the UFO code. In an example, 'z3r' is defined in the fourth 'point' tag, and 'z3r' moves its position as much as a change in thickness of the point 'z2r' depending on the x axis coordinate 'x2r' of the point 'z2r' having the preset position coordinates. In another example, 'z3l' is defined in the seventh tag 'point', and 'z3l' moves its position as much as a change in thickness of the point 'z1r' depending on the x axis coordinate 'x1r' of the point 'z1r' having the preset position coordinates. That is, 'z3l' and 'z3r' are set to maintain the straight line in the linear shape by moving together as much as a change in the x coordinate of 'z1r' and 'z2r' depending on the x axis coordinate of 'z1r' and 'z2r' respectively.

Additionally, 'serif' (fourth attribute) is added to the tag 'point' in the UFO code. That is, serif is added to the two ends z1l, z2l of the vertical stroke. In this instance, serif is represented at the corresponding position of the font in METAFONT generated by the output font generation unit 430.

FIGS. 5A to 7B are diagrams for describing additional attributes of METAFONT according to an embodiment of the present disclosure.

According to an embodiment of the present disclosure, the attributes for METAFONT added in the step 520 may further include attributes as shown in the following Table 2, and they may be included in the tag 'point' of the UFO code.

TABLE 2

| Attribute name | Description | Essential or optional |
|---|---|---|
| Round (First additional attribute) | Set roundness at the end of stroke or curved part of stroke | Optional |
| char (Second additional attribute) | Set grapheme or radical information of corresponding outline | Optional |
| formType (Third additional attribute) | Set combination type of character | Optional |
| cmClass (Fourth additional attribute) | Set combination group information of outline such as initial letter/medial letter/final letter/radical/left part/right part | Optional |
| stClass (Fifth additional attribute) | Set information of partial stroke such as vertical line/horizontal line/stem/dot/slash/vertex | Optional |
| double (Sixth additional attribute) | Set position in components of double consonant | Optional |
| stroke (Seventh additional attribute) | Set position information such as start/end/curve of stroke | Optional |

In detail, METAFONT may adjust the curve at the end of the stroke of the character or the curved part of the stroke, and to this end, the first additional attribute (Round) is used. That is, the first additional attribute (Round) is an attribute for setting the roundness of the stroke appearing on the points that form the outline, and it is an optional attribute.

Additionally, METAFONT may set if the outline of the character is a grapheme or a radical, and to this end, the second additional attribute (char) is used. That is, the second additional attribute (char) is an attribute for setting whether the character generated by the outline is used as a grapheme or a radical in a word generated by a plurality of characters, and it is an optional attribute.

Additionally, the third additional attribute (formType) is an attribute for setting a combination type of the character, the fourth additional attribute (cmClass) is an attribute for setting the position of the outline such as the initial letter, the medial letter, the final letter, the radical and the left and right parts, and the fifth additional attribute (stClass) is an attribute for setting a partial stroke represented by the outline such as vertical lines, horizontal lines, stems, dots, slashes and vertices, and it is an optional attribute.

Additionally, the sixth additional attribute (double) is an attribute for setting the position in a double consonant, and the seventh additional attribute (stroke) is an attribute for setting the position in the stroke such as the start, curve and end of the stroke of the character, and it is an optional attribute.

Hereinafter, the additional attributes for METAFONT will be described in detail with reference to FIGS. 5A to 7B.

Figure 5B:
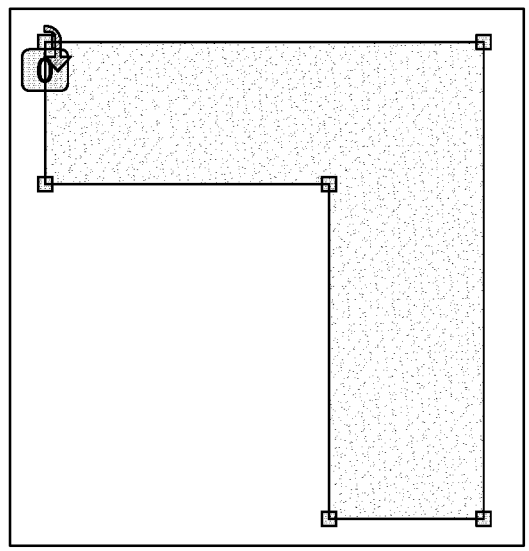

FIGS. 5A to 7B are diagrams showing an example of intermediate code (MetaUFO) according to the present disclosure. That is, FIG. 5A shows an intermediate code in which the attributes for METAFONT are added to UFO to represent the grapheme 'ㄱ', and FIG. 5B shows the grapheme 'ㄱ' of METAFONT generated through FIG. 5A.

Figure 6B:
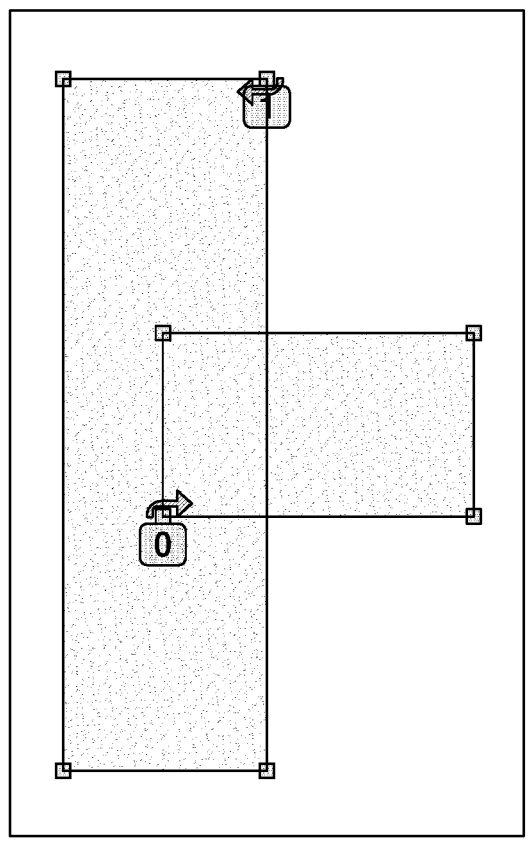

Additionally, FIG. 6A shows an intermediate code in which the attributes for METAFONT are added to UFO to represent the grapheme 'ㅏ', and FIG. 6B shows the grapheme 'ㅏ' of METAFONT generated through FIG. 6A.

Figure 7B:
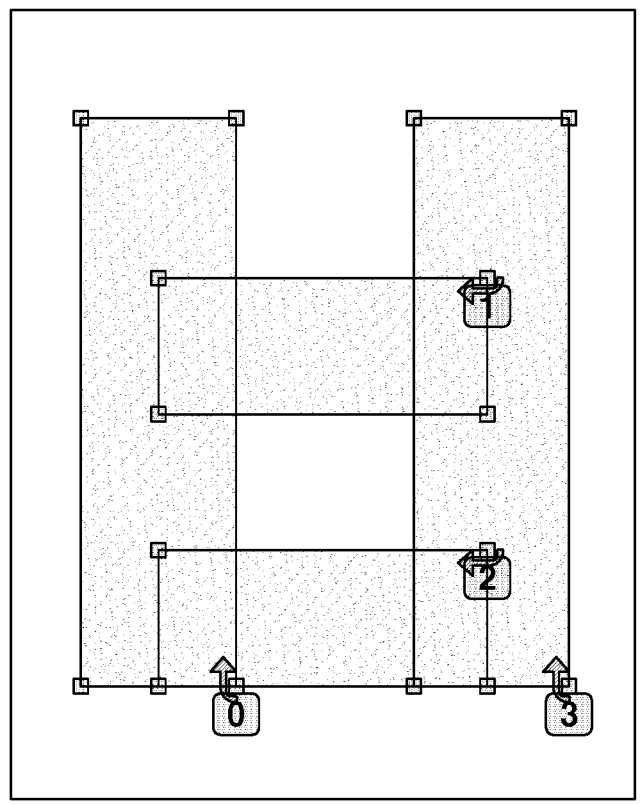

Additionally, FIG. 7A shows an intermediate code in which the attributes for METAFONT are added to UFO to represent the grapheme 'ㅂ', and FIG. 7B shows the grapheme 'ㅂ' of METAFONT generated through FIG. 7A.

Referring to FIGS. 5A, 6A and 7A, 'char' (second additional attribute) is added to the tag 'point' in the UFO code. In this instance, since 'ㄱ' and 'ㅏ' are used as graphemes, 'char' is set to '0' in each first tag 'point'.

On the other hand, since 'ㅂ' is used as the final letter, 'char' is set to '17' in the first tag 'point'.

Additionally, 'formType' (third additional attribute) is added to the tag 'point' in the UFO code. In this instance, 'formType' may set the shape of a character to a preset value, and here, 'formType' set to '2' may refer to a character including the initial letter, the medial letter and the final letter.

Additionally, 'Round' (first additional attribute) is added to the tag 'point' in the UFO code. In this instance, 'Round' sets the roundness at the end of the stroke, and with the increasing value, the roundness at the end of the stroke may increase. Accordingly, 'Round' set to '1' may be set to represent the end of the stroke in the shape of a straight line.

As described above, the additional attributes for METAFONT may be optionally used in the UFO code, and a value that is set in the UFO code may be changed depending on a preset value for each additional attribute, and accordingly, the shape of the character generated by the intermediate code may be changed.

Figure 9A:
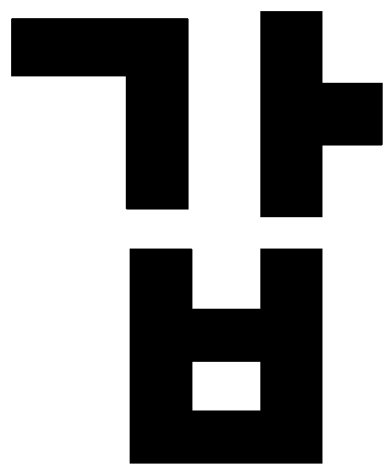
Figure 9B:
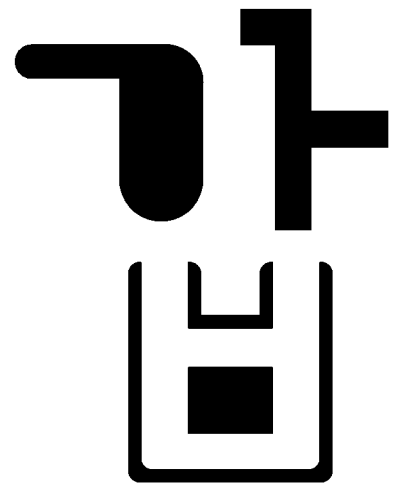

FIGS. 8 to 9B are diagrams showing an example of METAFONT code according to an embodiment of the present disclosure.

According to an embodiment of the present disclosure, the METAFONT code may be generated by receiving the intermediate code as an input file from the output font generation unit 430 and calculating data acquired by parsing.

Accordingly, the font user may generate fonts of various styles by changing the parameter values for changing the style in the generated METAFONT code.

Referring to FIG. 8, the parameter values for changing the style in the METAFONT code may include expr Width, Heigh, moveSizeOfH, moveSizeOfV, penWidthRate, penHeightRate, curveRate, serifRate, unfillRate and isUnfill, and accordingly, the font user may change the shape of the character by changing the parameter values in the METAFONT code.

Meanwhile, referring to FIGS. 9A and 9B, it can be seen that the shape of the character is changed by adjusting the size of each grapheme, and the contrast, thickness, curve, slope and unfill of the stroke in the METAFONT code.

In relation to this, it can be understood that the contrast, thickness and curve of the stroke are adjusted for the initial letter 'ㄱ', the thickness and serif of the stroke are adjusted for the medial letter 'ㅏ', and the curve and unfill of the stroke are adjusted for the final letter 'ㅂ'.

As described above, the font user can modify the character by changing the parameter values of the METAFONT code converted based on the attributes and additional attributes added into the UFO code.

FIGS. 10A to 10E are diagrams showing an example of METAFONT in which the style of the character is changed depending on the parameters separately applied to the initial letter.

The parameters separately applied to any one of the initial letter, the medial letter and the final letter of the Korean alphabet, known as Hangul (Hangeul), may be limited to a specific stroke or a specific character. Accordingly, the output font generation unit 430 may hierarchize the character into the whole set according to the attribute applied across the entire shape of the whole character and the partial set according to the attribute such as 'stClass'.

Figure 10A:
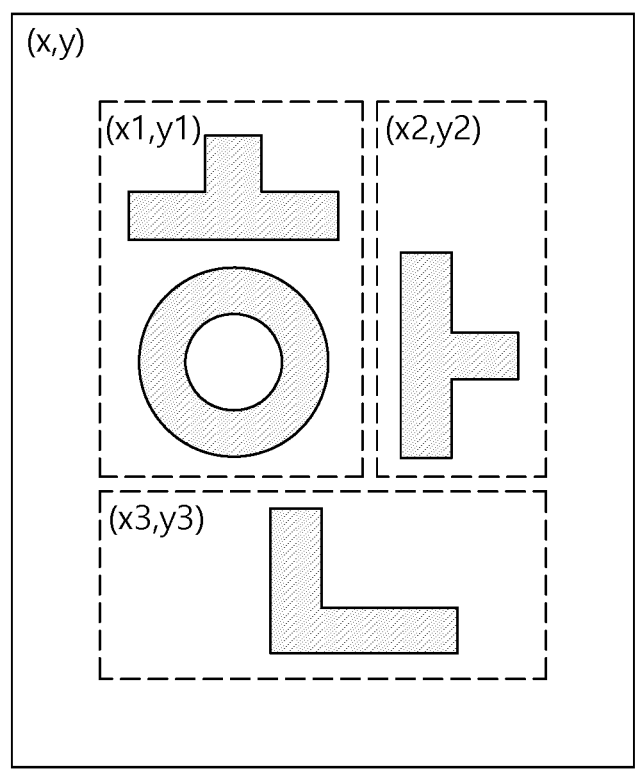
FIGS. 10A to 10E are diagrams showing an example of METAFONT in which the style of a character is changed depending on the parameters separately applied to the initial letter.

Referring to FIG. 10A, the whole set including the whole character '한' and the partial set classified into 'ㅎ', 'ㅏ' and 'ㄴ' are shown.

Here, x and y may refer to the whole coordinate system applied across the entire shape of the whole character, x1 and y1 may refer to the partial coordinate system applied to the shape of the initial letter, x2 and y2 may refer to the partial coordinate system applied to the shape of the medial letter, and x3 and y3 may refer to the partial coordinate system applied to the shape of the final letter.

Accordingly, the output font generation unit 430 may represent the attributes separately applied to a part of the character with the relational equation of the whole coordinate and the partial coordinate, and in this instance, a primary reference line may be determined according to the initial letter, the medial letter, the final letter and their combination method.

Figure 10B:
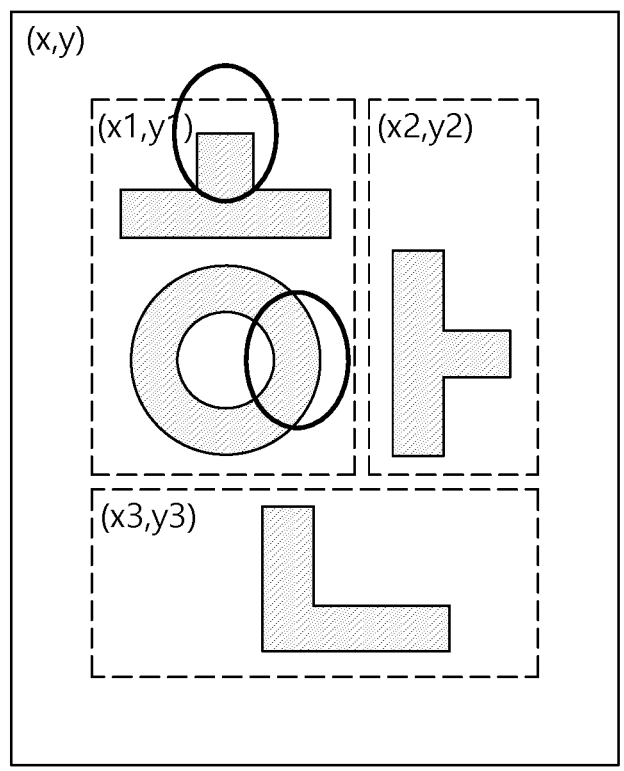

Referring to FIG. 10B, it can be seen that the position of the primary reference line for the initial letter is indicated by two circles, and in this instance, the primary reference line may be understood as the reference line of the outline font.

Accordingly, the shape of the character may be changed according to the attributes applied to the shape of the character with the primary reference line being at a fixed position.

FIGS. 10A to 10E are diagrams showing an example of METAFONT in which the initial letter is modified by the attributes separately applied to the initial letter.

Figure 10C:
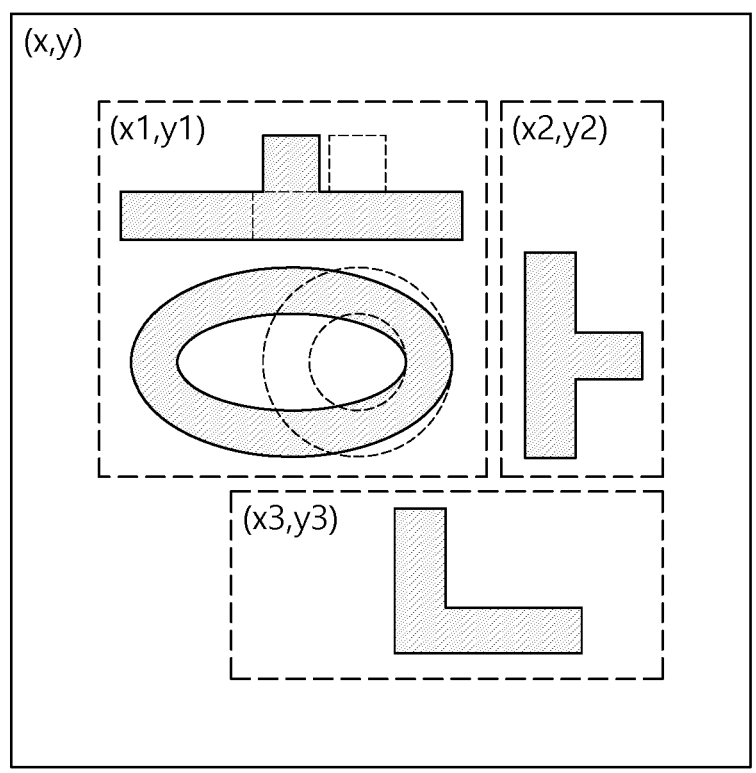

Referring to FIG. 10C, it can be seen that the shape of the initial letter is changed according to the relational equation of the following Equation 1.

$$x1 = ax + b$$
$$y1 = y \quad \text{[Equation 1]}$$

In this instance, Equation 1 may be understood as applying a predetermined slope to the whole coordinate system in the horizontal direction x1 of the initial letter, and accordingly, it can be seen that the initial letter is stretched by a predetermined amount in the horizontal direction.

Figure 10D:
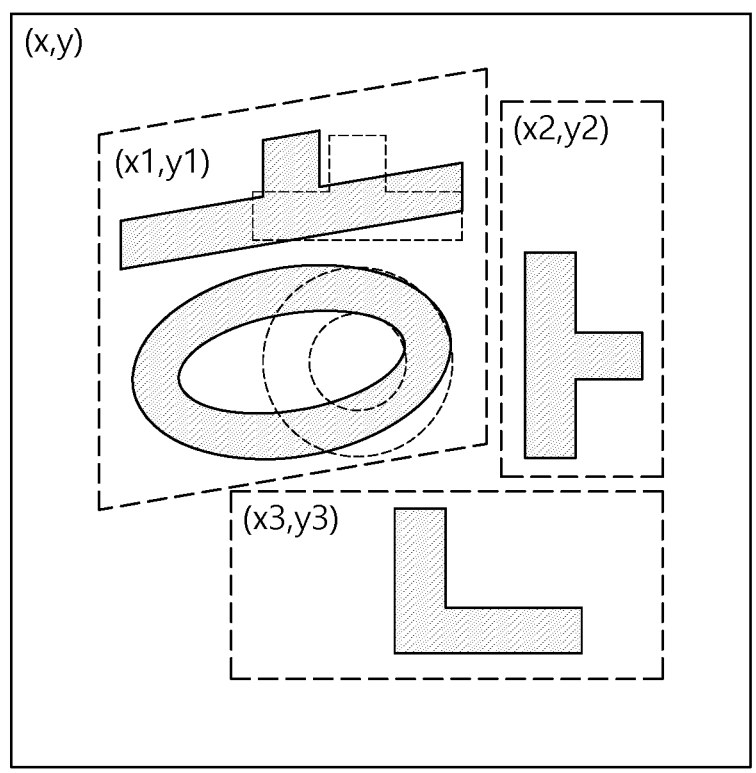

Referring to FIG. 10D, it can be seen that the shape of the initial letter is changed according to the relational equation of the following Equation 2, and in this instance, Equation 2 may be understood as applying the position movement with a change in the whole coordinate to the initial letter modified according to FIG. 10C in the vertical direction y1, and accordingly, it can be seen that the left and right parts of the initial letter are changed into falling and rising shapes respectively.

$$x1 = a(x+b) + c$$
$$y1 = y + dx + e \quad \text{[Equation 2]}$$

Figure 10E:
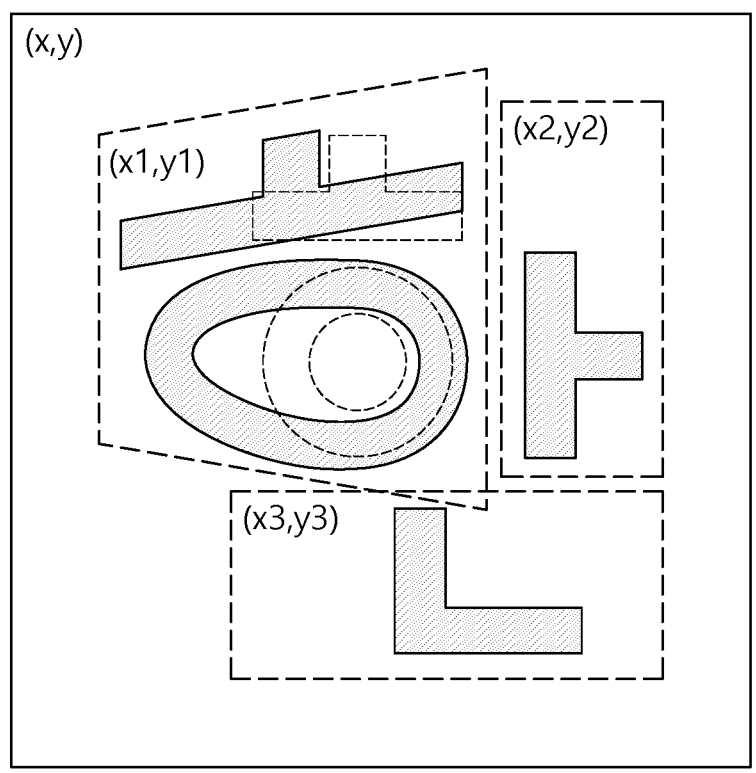

Referring to FIG. 10E, it can be seen that the shape of the initial letter is changed according to the relational equation of the following Equation 3, and in this instance, it can be seen that the initial letter is changed into a trapezoidal shape by modifying the low part of the initial letter shown in FIG. 10D according to Equation 3.

$$x1 = a(x+b) + c$$
$$y1 = y + d(x+e) + f \quad \text{[Equation 3]}$$

As described above, the output font generation unit 430 may change parts of the character by defining the relational equation between the whole coordinate system and the partial coordinate system without changing outline information of METAFONT.

Meanwhile, according to an embodiment of the present disclosure, the output font generation unit 430 generates a font in METAFONT using information of points acquired by parsing the intermediate code (MetaUFO) as described above. In this instance, the output font generation unit 430 may be implemented in Python, and may parse the intermediate code (MetaUFO) using the XML Parser which is a library provided by Python. Additionally, the output font generation unit 430 writes METAFONT code by calculating data acquired through parsing with data necessary for METAFONT. Additionally, additional processing may be performed by calling the functions corresponding to the attributes of METAFONT added by the user. Additionally, the METAFONT code is generated by applying 14 parameters provided to the user to change the style of the character. The parameters may be added or deleted where necessary.

Additionally, as opposed to the Latin alphabet, the Korean alphabet is represented by combining the initial letter, the medial letter and the final letter that are divided according to the components of a syllable. Accordingly, the output font generation unit 430 may generate a character by calling graphemes necessary for the initial letter, the medial letter and the final letter stored as files. To this end, the output font generation unit 430 may determine whether a file under processing is a grapheme or a character calling graphemes using data acquired through parsing, and accordingly execute the corresponding routine.

In this instance, when the file under processing is a combination type character calling graphemes, the output font generation unit 430 identifies the referenced grapheme and generates the parameters applied only to each grapheme along with the METAFONT function calling the corresponding grapheme. Additionally, the output font generation unit 430 generates the code by applying the width, height and slope parameters of the character that affect the whole style of the character.

Additionally, when the file under processing is a grapheme, the output font generation unit 430 represents a character in METAFONT using information of points acquired by parsing. To represent a character in METAFONT, the output font generation unit 430 first defines a reference point, sets the thickness of two points forming a pair, defines control points, and represents the character using the curve drawing function. Accordingly, the output font generation unit 430 writes the code using data acquired by parsing and applies various parameters that affect the character.

Meanwhile, the output font generation unit 430 may hierarchize a font generated from the METAFONT code into the whole set representing the whole character represented by the font and the partial set representing a part of the character represented by the font. In the METAFONT code, it may be understood that the code applied to the whole character is set to the whole set, and the code applied to any one of the initial letter, the medial letter and the final letter of the character is each set as the partial set.

The present disclosure includes a function of converting to Cubic curves to fully represent the curve representation of the outline font represented by Quadratic curves and Cubic curves in METAFONT. This operation is performed by the output font generation unit 430 (step 530). In summary, the present disclosure generates a new font by generating the METAFONT code by the application of METAFONT attributes to UFO, one of the outline font formats. The existing outline font cannot freely change the thickness or style of the character, but METAFONT can freely change the style using the parameters. Accordingly, it is possible to generate the METAFONT code using the basic outline font alone and adjust the thickness according to the parameters controlled by the user without 'font family' of the outline font that requires the creation and provision of multiple sets with the change in style such as thickness. Additionally, it is possible to generate the characters of various shapes using the parameters provided to suit the characteristics of the Korean alphabet.

Additionally, the embodiments of the present disclosure may be implemented in the form of program instructions that can be executed through a variety of computer devices and may be recorded in computer-readable recording media. The computer-readable recording media may include program instructions, data files and data structures, alone or in combination. The program instructions recorded in the media may be specially designed and configured for the present disclosure or may be known and available to those having ordinary skill in the industry of computer software. Examples of the computer-readable recording media include magnetic media such as hard disk, floppy disk and magnetic tape, optical media such as CD-ROM and DVD, magneto-optical media such as floptical disk, and ROM, RAM and flash memory, and examples of the program instructions include machine code generated by a compiler as well as high-level language code that can be executed by a computer using an interpreter. The hardware device may be configured to act as one or more software modules to perform the operation of an embodiment of the present disclosure, or vice versa.

While the present disclosure has been hereinabove described with regard to the specific subject matter such as specific elements and a limited number of embodiments and drawings, this is only provided to help the full understanding of the present disclosure, and the present disclosure is not limited to the disclosed embodiments, and it is obvious to those skilled in the art that a variety of modifications and changes may be made to the present disclosure. Accordingly, the spirit of the present disclosure should not be limited to the disclosed embodiments, and it should be noted that the appended claims and the scope of equivalents to which such claims are entitled fall within the spirit and scope of the present disclosure.

What is claimed is:

1. A font generating method for changing partial character style, performed by a device including a processor, the font generating method comprising:
    generating an intermediate code by adding attributes for METAFONT to code of an outline font described in eXtensible Markup Language (XML);
    generating a font in the METAFONT using information of points acquired by parsing the intermediate code;
    classifying the font into a whole set representing a whole of a character represented by the font and a partial set representing a part of the character represented by the font;
    generating a relational equation according to a relationship between the whole set and the partial set; and
    changing a style of the font according to the relational equation,
    wherein the attributes for the METAFONT include a first attribute for setting two of points for forming an outline as a pair, a second attribute specified at a start point of the outline and for setting whether to fill an inside of the outline, a third attribute for changing position coordinates of one point among the points depending on position coordinates of the other point of which the position coordinates are preset, and a fourth attribute for setting a serif of the points,
    wherein the relational equation represents the attributes separately applied to each of components of the character of the whole set and the partial set,
    wherein the font in the METAFONT includes a primary reference line determined according to a position of the character and a combination type of the character,
    wherein changing the style of the font according to the relational equation comprises changing the character represented by the font according to the relational equation while the attributes for the METAFONT are maintained and the primary reference line is fixed.

2. The font generating method of claim 1, wherein the attributes for the METAFONT include at least one of a first additional attribute for adjusting roundness at an end of a stroke of the character or a curved part of the stroke, a second additional attribute for determining a grapheme and a radical of an outline, a third additional attribute for setting a combination type of the character, a fourth additional attribute for setting a position of the outline of the components of the character, a fifth additional attribute for setting a partial stroke represented by the outline, a sixth additional attribute for setting a position in a double consonant, or a seventh additional attribute for setting a shape of the stroke of the character.

3. The font generating method of claim 1, wherein a non-transitory computer-readable recording medium having records a program for performing the font generating method.

4. The font generating method of claim 1, wherein the style of the font is changed by changing a style of at least one of the components of the character according to parameter values,
    wherein the parameter values are converted from the attributes or additional attributes, and
    wherein the components of the character include an initial letter, a medial letter, a final letter, a radical, a left part, and a right part.

5. The font generating method of claim 1, wherein the whole set is generated to include the character represented by the font which is classified into syllables, and
    wherein the partial set is generated to include a grapheme represented as at least one of an initial letter, a medial letter, or a final letter according to the syllables of the character represented by the font.

6. A font generating device, comprising at least one processor configured to:
    generate an intermediate code by adding attributes for METAFONT to code of an outline font described in eXtensible Markup Language (XML);
    generate a font in the METAFONT using information of points acquired by parsing the intermediate code;
    classify the font into a whole set representing a whole of a character represented by the font and a partial set representing a part of the character represented by the font;
    generate a relational equation according to a relationship between the whole set and the partial set; and
    change a style of the font according to the relational equation,
    wherein the attributes for the METAFONT include a first attribute for setting two of points for forming an outline as a pair, a second attribute specified at a start point of the outline and for setting whether to fill an inside of the outline, a third attribute for changing position coordinates of one point among the points depending on position coordinates of the other point of which the position coordinates are preset, and a fourth attribute for setting a serif of the points, wherein the relational equation represents the attributes separately applied to each of components of the character of the whole set and the partial set, wherein the font in the METAFONT includes a primary reference line determined according to a position of the character and a combination type of the character, wherein the processor is further configured to change the style of the font by changing the character represented by the font according to the relational equation while the attributes for the METAFONT are maintained and the primary reference line is fixed.

7. The font generating device of claim 6, wherein the attributes for the METAFONT include at least one of a first additional attribute for adjusting roundness at an end of a stroke of the character or a curved part of the stroke, a second additional attribute for determining a grapheme and a radical of an outline, a third additional attribute for setting a combination type of the character, a fourth additional attribute for setting a position of the outline of the components of the character, a fifth additional attribute for setting a partial stroke represented by the outline, a sixth additional attribute for setting a position in a double consonant or a seventh additional attribute for setting a shape of the stroke of the character.

8. The font generating device of claim 6, wherein the style of the font is changed by changing a style of at least one of the components of the character according to parameter values, wherein the parameter values are converted from the attributes or additional attributes, and wherein the components of the character include an initial letter, a medial letter, a final letter, a radical, a left part, and a right part.

9. The font generating device of claim 6, wherein the whole set is generated to include the character represented by the font which is classified into syllables, and wherein the partial set is generated to include a grapheme represented as at least one of an initial letter, a medial letter, or a final letter according to the syllables of the character represented by the font.

* * * * *